(12) United States Patent
Delfino et al.

(10) Patent No.: US 6,346,751 B1
(45) Date of Patent: Feb. 12, 2002

(54) SAFETY TOOL MOUNT FOR ROBOTIC APPARATUS

(75) Inventors: Antonio Delfino; Dario Delfino, both of Milan (IT)

(73) Assignee: OCIM, S.R.L., St. Louis, MO (US)

( * ) Notice: Subject to any disclaimer, the term of this patent is extended or adjusted under 35 U.S.C. 154(b) by 0 days.

(21) Appl. No.: 09/503,567

(22) Filed: Feb. 14, 2000

(51) Int. Cl.⁷ .................................................. H02H 1/00
(52) U.S. Cl. .......................... 307/326; 901/49; 307/119
(58) Field of Search .................... 901/49; 307/326–328, 307/119

(56) References Cited

U.S. PATENT DOCUMENTS

| | | |
|---|---|---|
| 4,500,065 A | 2/1985 | Hennekes et al. |
| 4,540,331 A | 9/1985 | Stanner et al. |
| 4,540,869 A | 9/1985 | Yasuoka |
| 4,700,932 A | 10/1987 | Katsuno |
| 4,714,865 A | 12/1987 | Chin et al. |
| 4,998,606 A | 3/1991 | McCormick et al. |
| 5,086,901 A | 2/1992 | Petronis et al. |
| 5,194,791 A | 3/1993 | Cull |
| 5,293,809 A | 3/1994 | Van Der Heijden et al. |
| 5,626,216 A | 5/1997 | Spoerling et al. |
| 5,697,480 A | 12/1997 | Herbermann et al. |
| 5,775,750 A | 7/1998 | Gauci et al. |
| 5,807,408 A | 9/1998 | Ruiz |
| 6,069,415 A | * 5/2000 | Little et al. .................. 307/326 |

OTHER PUBLICATIONS

Tweco Robotics Catalog, Cover, Table of Contents and pp. 15–21, dated 1998.
Ocim robotics Catalog and Operating Instructions, dated Jan. 10, 1997.
Ocim "AWS Antishock Welding System" brochure dated Jan. 9, 1997.

* cited by examiner

Primary Examiner—Fritz Fleming
(74) Attorney, Agent, or Firm—Senniger, Powers, Leavitt & Roedel

(57) ABSTRACT

A safety mount for a tool on robotic apparatus, for protection of the tool should it encounter an obstruction to movement by the apparatus. The mount includes a hollow housing having a first end, a second end and a central axis passing through the ends. The housing is attachable at its first end to the robotic apparatus. Electrical switches are mounted in the housing radially outward of the axis, each switch having an operating member facing toward the first end of the housing and being biased toward the first end to a position establishing a first circuit condition and movable to a pressed-down position establishing a second circuit condition. A presser head is mounted in the housing and is biased for pressing down the switch-operating members. The presser head has a stem extending generally on the axis out of the second end of the housing for attachment of a tool holder thereto. The tool acts on encountering an obstruction either to deflect the stem at an angle resulting in angular deflection of the presser head to release at least one switch-operating member or to move the stem inwardly with respect to the housing with resultant axial movement of the presser head away from the switch-operating members to release all of them, thereby establishing the first circuit condition as a safety signal.

20 Claims, 10 Drawing Sheets

SAFETY TOOL MOUNT FOR ROBOTIC APPARATUS

BACKGROUND OF THE INVENTION

This invention relates to safety tool mounts for robotic apparatus, and more particularly to a device for mounting a tool, especially a welding torch, on the working arm of the apparatus, the device incorporating, for safety, means for deactivating the apparatus to prevent damage to the tool (or the apparatus) if the tool in the course of its movement by the apparatus should erroneously engage an impediment or obstruction to its movement thereby imposing deleterious force on the tool. The device may be referred to as a robotic deflection mount.

While the invention has been developed primarily for mounting a welding torch on the arm of robotic apparatus for robotic welding, it is to be understood that the mount of the invention may be readily adapted for mounting other tools for robotic operation, such as a cutting tool, an adhesive applicator, a grinding tool, etc.

Reference may be made to the following U.S. patents for examples of devices in the same general class as the present invention:

| U.S. Pat. No. | Title | Issue Date |
| --- | --- | --- |
| 4,500,065 | Releasable Tool Mount for Manipulator | February 19, 1985 |
| 4,540,331 | Cut Out Device | September 10, 1985 |
| 4,540,869 | Welding Torch | September 10, 1985 |
| 4,714,865 | Overload Protection Device | December 22, 1987 |
| 4,998,606 | Programmable Breakaway Clutch System With Collapsible Failure Mode | March 12, 1991 |
| 5,086,901 | Robot Overload Detection Device | February 11, 1992 |
| 5,626,216 | Tool Holder, In Particular for Robot Welding Or Cutting Torches | May 6, 1997 |
| 5,775,750 | Robotic Collision Detection Bumper | July 7, 1998 |

BRIEF SUMMARY OF THE INVENTION

Among the several objects of the invention may be noted the provision of an improved safety mount for a tool such as a welding torch or other working instrumentality on robotic apparatus, the safety mount being improved to the extent of being more sensitive for deactivation of the robotic apparatus in the event the tool or instrumentality encounters an obstruction; the provision of such a safety mount which sensitively provides protection on angular or longitudinal deflection of the tool or instrumentality; the provision of such a safety mount which, while sensitive, provides protection in the event shutdown of the robotic apparatus for some reason should not occur immediately on occurrence of a deflection; and the provision of a safety mount having all the preceding attributes which is of such construction as to allow for acceptable tolerances in the manufacture thereof, which is readily installed on the robotic apparatus, and which is efficient and reliable in operation.

In general, in a first consideration thereof, the invention resides in a safety mount for a tool or other working instrumentality on robotic apparatus, for protection thereof should the tool or instrumentality encounter an obstruction to movement by the apparatus. The mount comprises a hollow housing having a first end and a second end and an axis extending longitudinally thereof passing through said ends, the housing being attachable at said first end to the robotic apparatus for robotic movement thereof. A plurality of electrical switches is mounted in the housing radially outward of said axis, each having an operating member facing toward said first end of the housing and biased toward said first end to a position establishing a first circuit condition and movable to a pressed-down position establishing a second circuit condition. A presser head for the switches in the housing biased in the direction toward said second end for pressing down the switch-operating members has a stem extending generally on said axis out of the second end of the housing for attachment thereto of a holder for said tool or instrumentality. The tool or instrumentality acts on encountering an obstruction either to deflect the stem at an angle to said axis with resultant angular deflection of the presser head releasing at least one switch-operating member or to move the stem inwardly with respect to the housing with resultant axial movement of the presser head away from the switch-operating members releasing all of them, thereby establishing said first circuit condition as a safety signal. In a second consideration, the invention encompasses a safety mount having a plurality of pairs of electrical terminals in the housing, each pair being situated radially outward of said axis, a member having a head in the housing and a stem extending generally on said axis out of the second end of the housing for attachment thereto of a holder for the tool or instrumentality. The member is biased in the direction toward said second end of the housing for effecting electrical connection of the terminals of each pair. The pairs of electrical terminals are connected in an electrical circuit in series for completion of the circuit when the terminals of each pair are connected. The circuit is broken when the tool or instrumentality encounters an obstruction with resultant angular deflection of the presser head breaking at least one of the connections or when the encounter moves the stem axially inward with resultant movement of the presser head to break all the connections.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
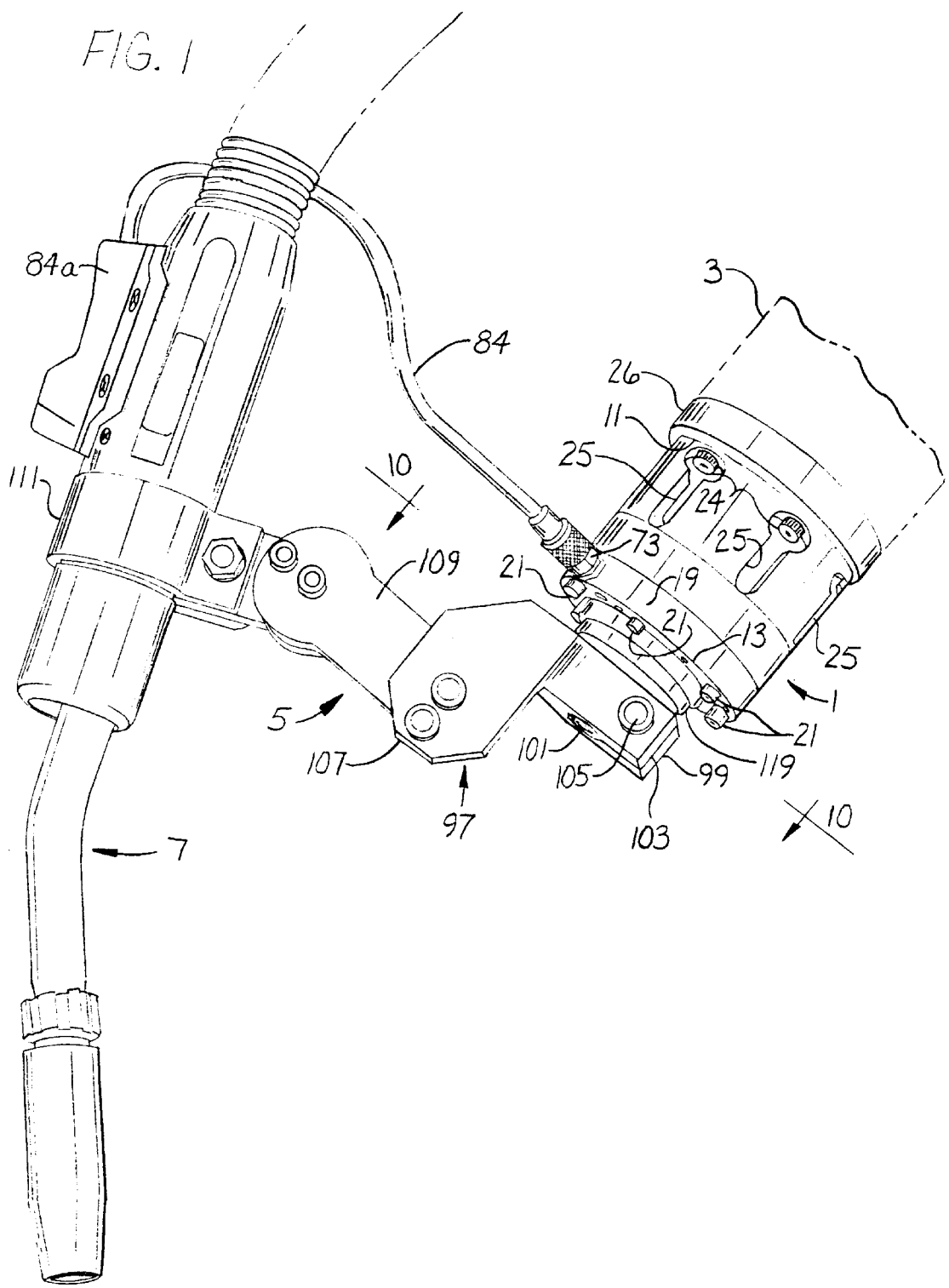
FIG. 1 is a perspective showing a safety mount of the invention attached to the working arm (illustrated in phantom) of robotic apparatus (not otherwise illustrated), with means thereon holding a welding torch.

Referring first to FIG. 1 of the drawings, a safety mount of this invention indicated in its entirety by the reference numeral 1 is shown in its position as attached to the working arm 3 (shown in phantom) of robotic apparatus (not otherwise shown), the safety mount having means such as indicated in its entirety at 5 holding a welding torch 7. The torch may be of any conventional well-known type, such as a MIG (metal inert gas) welding torch and further description thereof does not appear to be necessary particularly since its detailed construction is not at all critical as far as this invention is concerned. Here it is to be understood that the safety mount 1, by suitable adaptation of the holding means (if even necessary), may be used for tools other than a welding torch such as cutting or grinding tools and, indeed for working instrumentalities which may not be thought of as tools, such as adhesive or sealant applicators and the like. It will be understood that, in programming the robotic apparatus for wielding the welding torch to do its work, and in endeavoring to perform the work, the torch may encounter an obstruction, and such encounter may cause damage to the torch or the robotic apparatus. As will be subsequently described, the safety mount 1 averts such damage by signaling the robotic apparatus to shut down.

Figure 3:
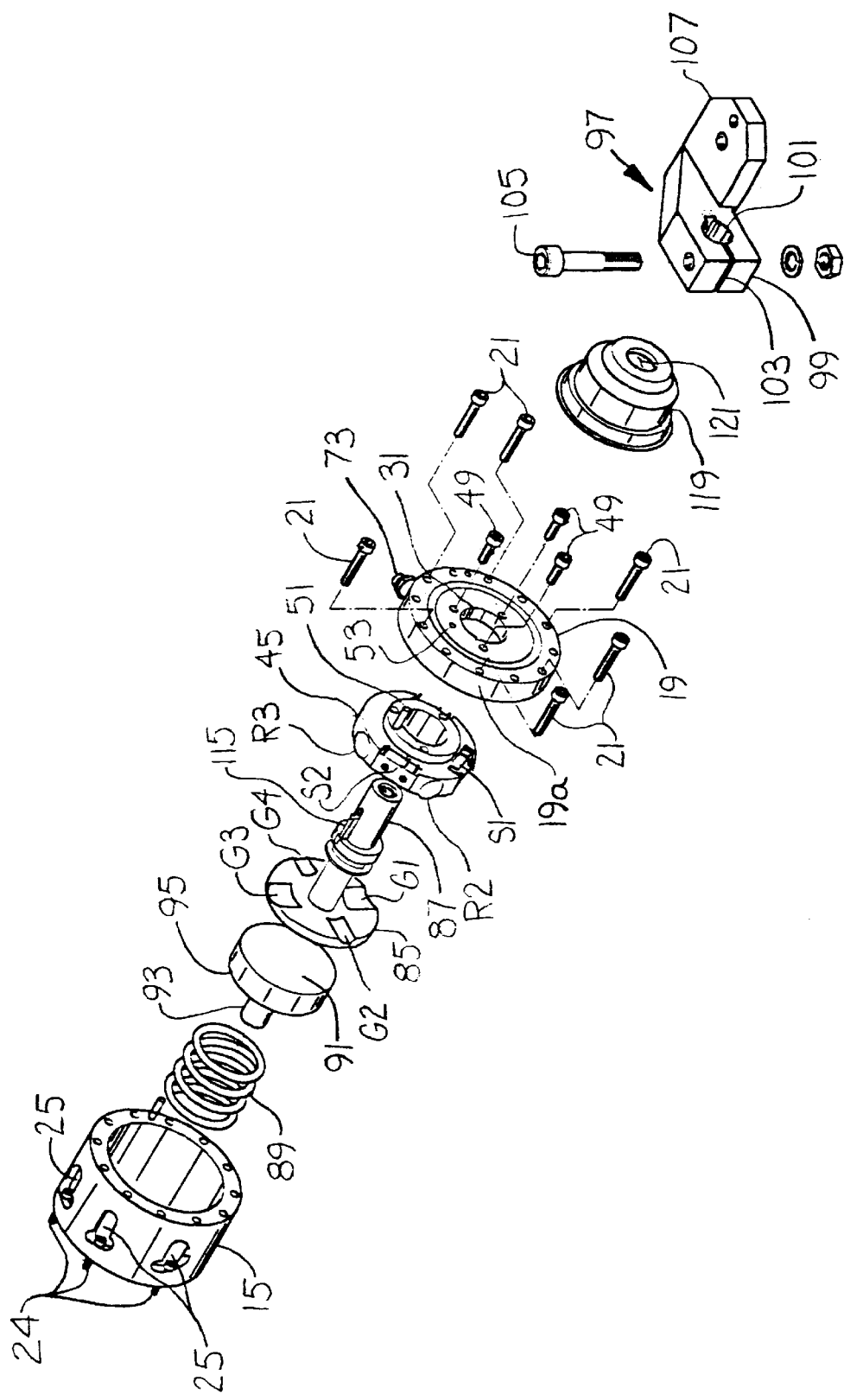
FIG. 3 is an exploded view showing the components of the safety mount as if disassembled, including a component of the torch holding means.
Figure 4:
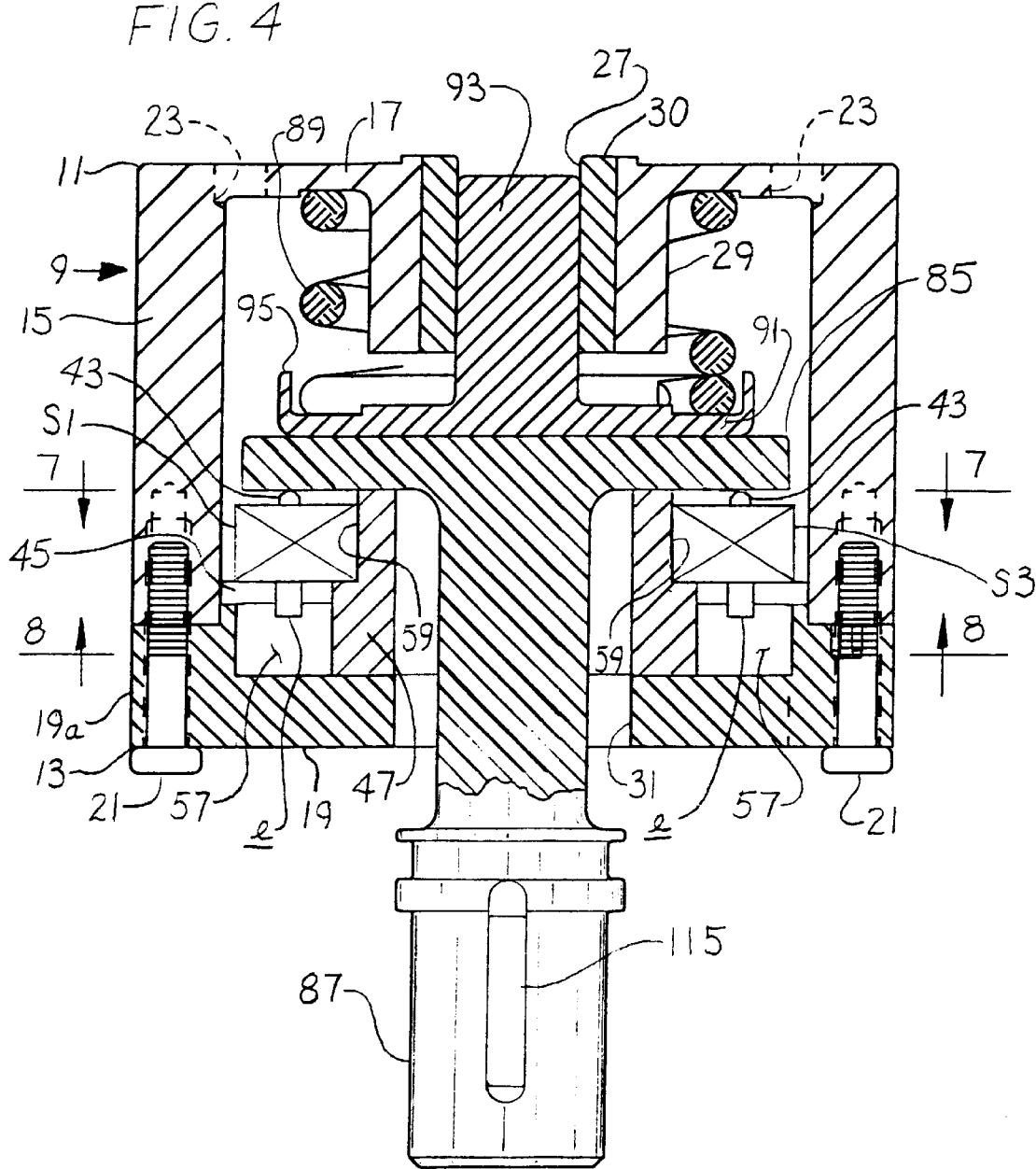
FIG. 4 is a longitudinal section of the safety mount, taken generally on line 4—4 of FIG. 7, showing parts in what may be regarded as their normal or home position, parts being omitted.

Referring to FIG. 4, the safety mount 1 comprises a hollow housing 9 having a first end 11 and a second end 13 and an axis A extending longitudinally thereof passing through said ends. The housing is cylindric in form, having an annular cylindric wall 15, and an end wall 17 (denoted the first end wall at said first end) integral with the wall 15 at its end 11 and an end wall 19 (denoted the second end wall) secured by screws 21 at the end 13 of the housing. The end wall 17 has a series of holes 23 spaced at intervals around a circle inward of and adjacent the annular wall for receiving screws 24 (FIGS. 2 and 3) for attaching the housing at its first end 11 to the arm 3 of the robotic apparatus. The annular wall 15 is formed with a series of slots 25 extending longitudinally thereof for access to the holes 23 for the application of the screws. An alternative mode of providing for attachment of the housing to the arm of the robotic apparatus is to bore holes all the way through the cylindric wall 15 from one end to the other and supply long screws received in these holes and threaded in tapped holes in the arm. For attachment to certain robot arms an adapter plate such as indicated at 26 in FIG. 1 may be used, the adapter plate being attached to the arm by screws and having tapped holes for receiving the screws 24 for attachment of the housing. End wall 17 has a generally central opening 27 and a tubular guide 29 with a bushing 30 (e.g. a bronze bushing) therein, extending inward generally on axis A. End wall 19 has a generally central opening 31.

Figure 7:
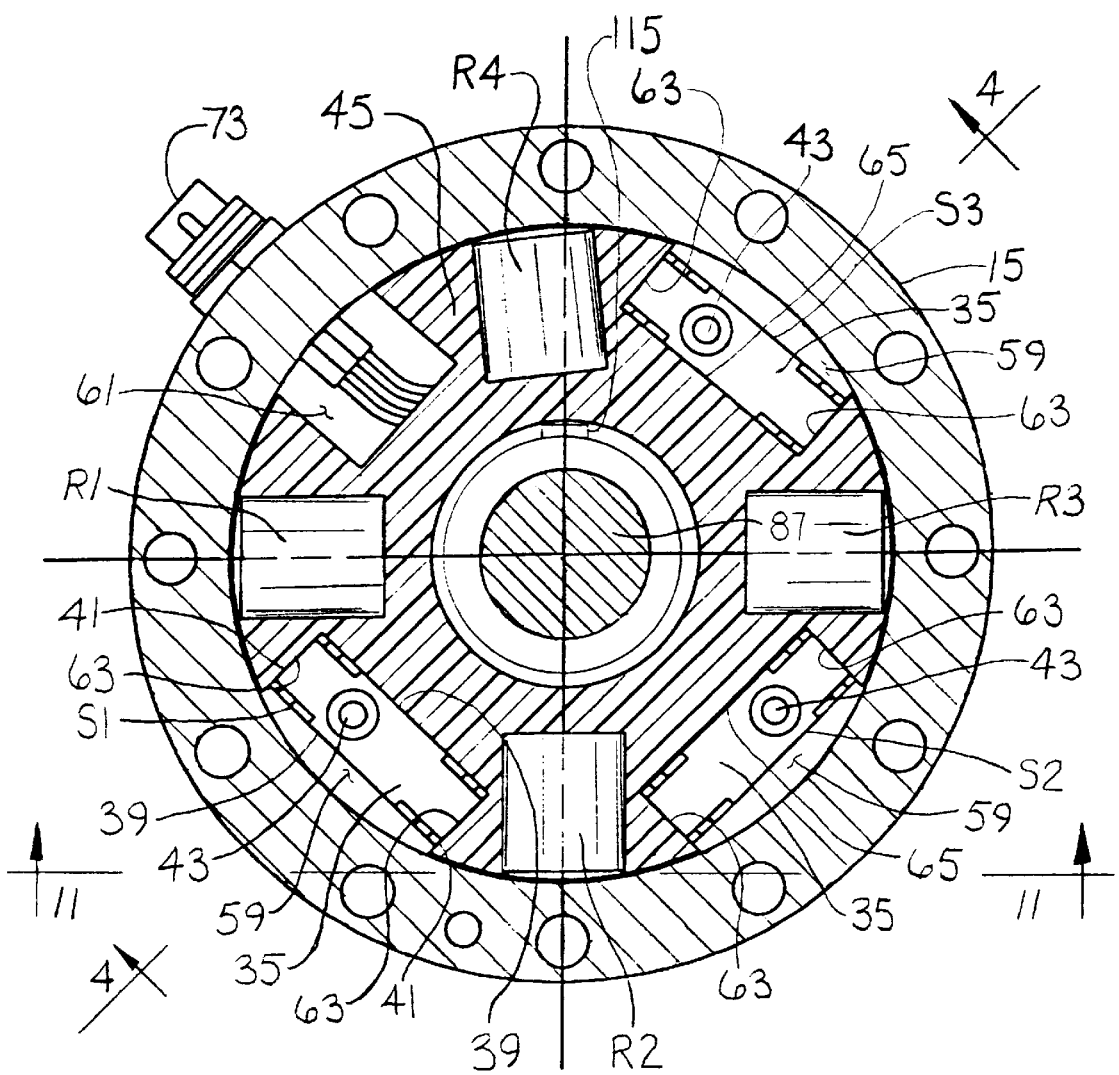
FIGS. 7 and 8 are transverse sections taken generally on lines 7—7 and 8—8, respectively, of FIG. 4.
Figure 8:
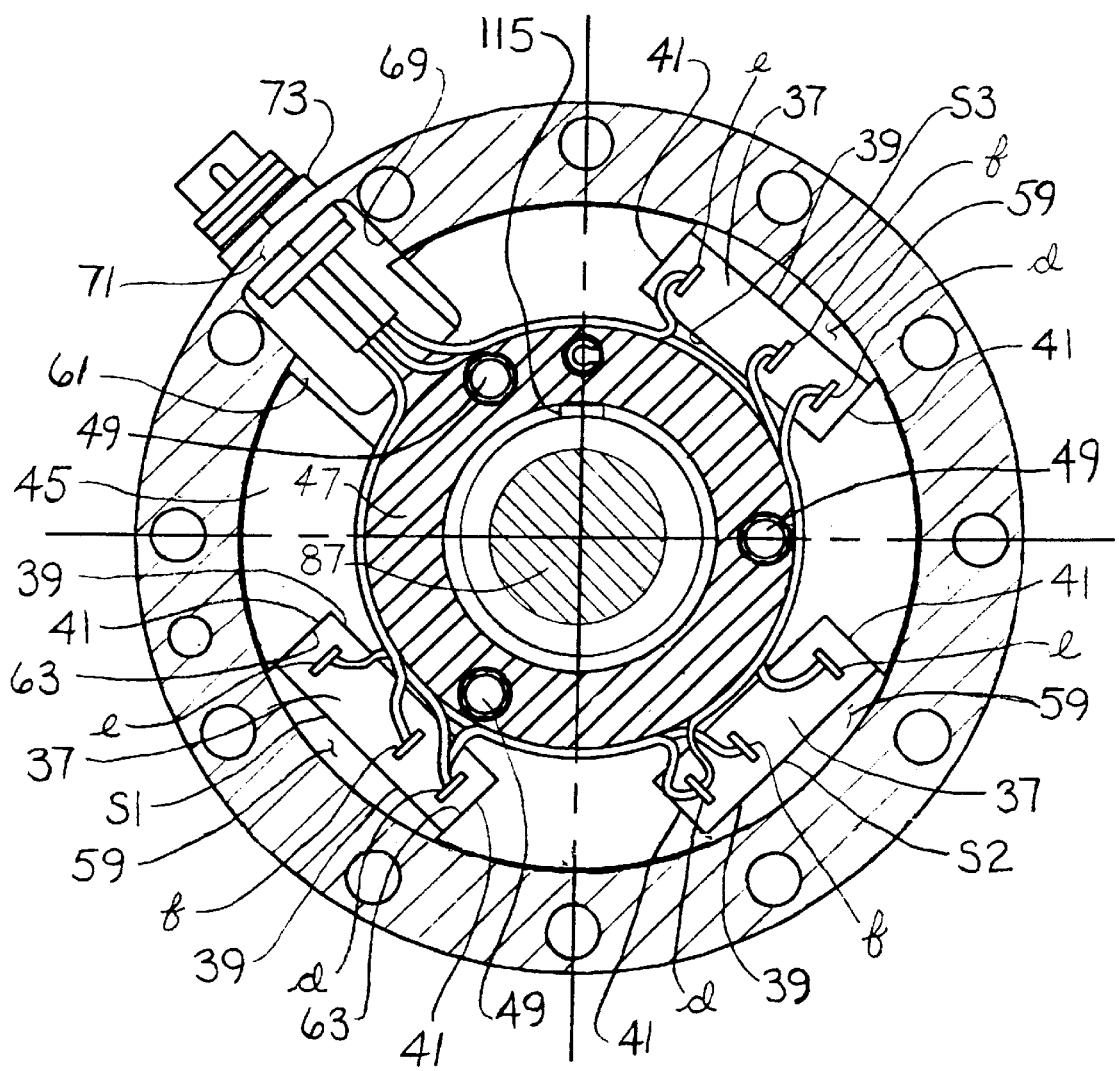

A plurality of electric switches is mounted in the housing radially outward of axis A adjacent the second end 13 of the housing 9. More particularly, three switches S1, S2, S3 are so mounted in the housing, each switch being a double-throw microswitch such as a commercially available Model No. V4NT7 microswitch sold by SA1A—Burgess Electronics Holding AG of Bahnhofstrasse 18, 3280 Murten, Switzerland, comprising a plastic case having a top 35, bottom 37, sides 39 and ends 41, with a switch-operating member constituted by a button 43 at the top (FIGS. 7 and 8). The microswitches are mounted in a ring 45 (FIG. 3) secured in the housing 1 adjacent the second end 13 of the housing, the ring having a central reduced-diameter annular boss 47 on the side thereof toward end wall 19. The ring is secured in place on the end wall 19 by means of screws 49 extending through holes in the end wall 19 threaded in tapped holes in the boss 47, the ring having a registration pin 51 received in a hole 53 in end wall 19 (see FIG. 3). With the ring 45 having the reduced-diameter boss seated on the end wall 19, the arrangement is such as to provide an annular space or passage 57 under the ring 45 surrounding the boss 47 bottomed by the end wall 19 and surrounded by a rim 19a (FIG. 4) of the end wall 19.

Figure 6:
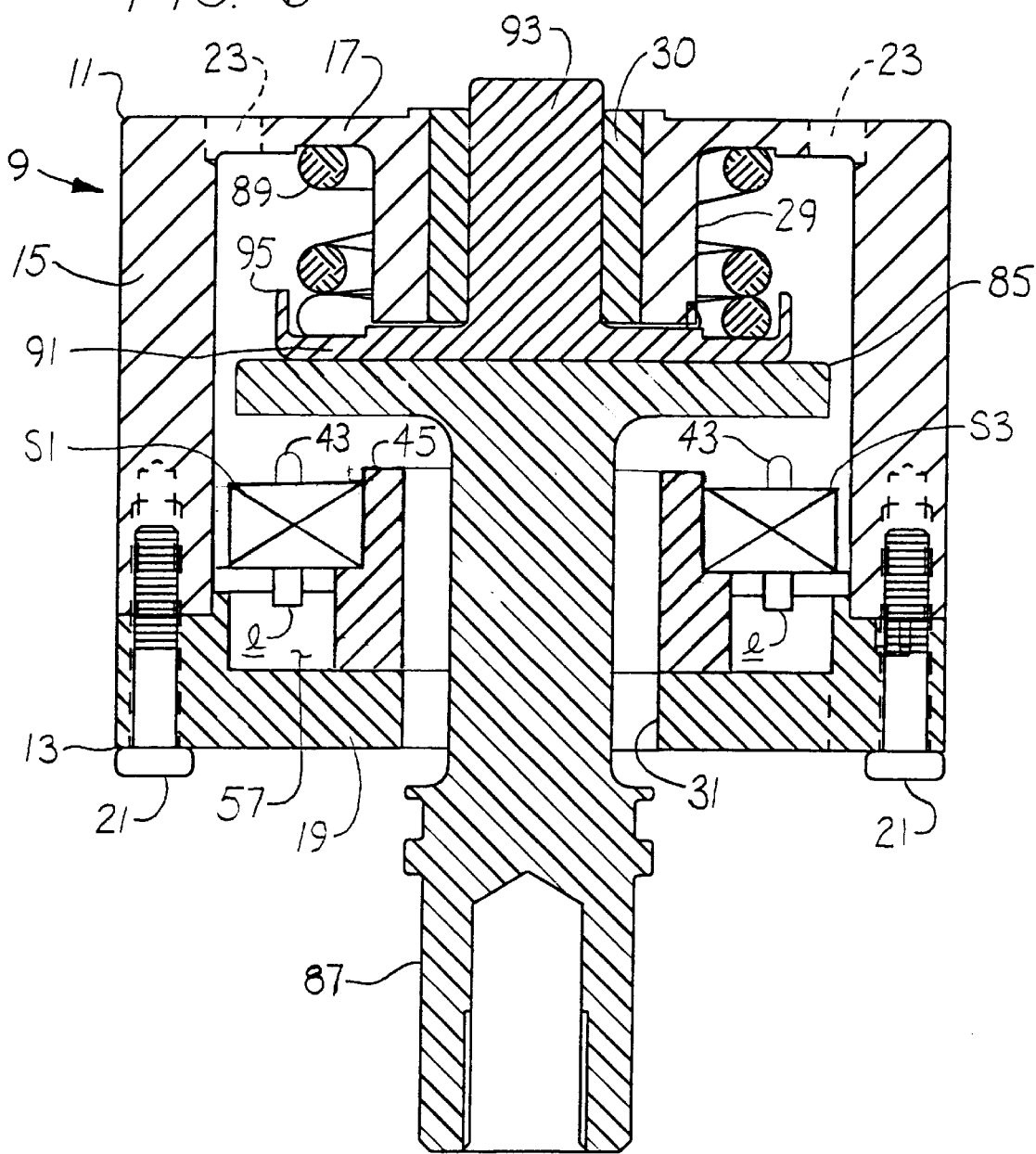

Each microswitch S1, S2, S3 is secured in a recess 59 in the ring 45 with its operating button 43 on top facing the end 11 of the housing 9 as by means of screws (not shown) extending sidewise through holes in the switch case threaded in tapped holes in the ring. There are such three recesses 59 in the ring, one for each switch, and a fourth recess 61 for a purpose which will subsequently appear. The recesses 59 and 61 are spaced around the ring at generally 90° intervals (see FIGS. 7 and 8). Each recess 59 is shaped for the respective switch to fit closely therein, having parallel end surfaces 63 spaced a distance for reception of the switch case extending lengthwise therebetween and an inside surface 65 engaged by the inside face of the switch case. Each recess 59 opens at the top (i.e., at the face of the ring 45 toward the end 11 of the housing) and at the bottom toward the annular passage 57, as shown in FIG. 6.

Figure 9:
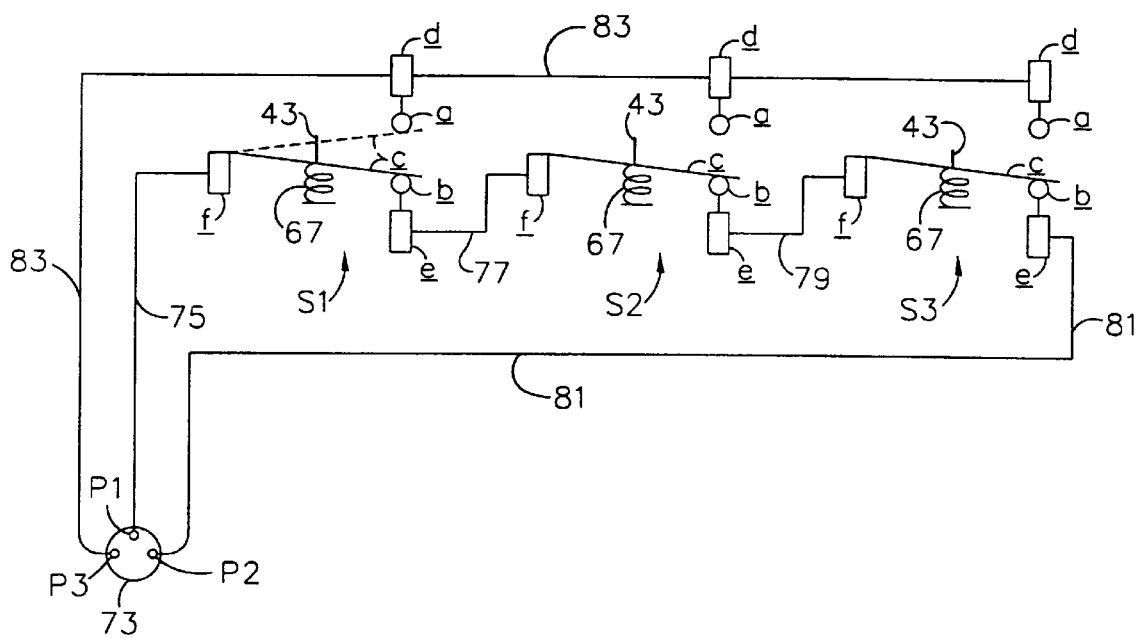
FIG. 9 is a wiring diagram.

Referring to FIG. 9, each microswitch S1, S2, S3 is shown as comprising a pair of fixed contacts a and b and a contactor c movable between a position contacting contact a and a position contacting contact b. The movable contactor is biased as by a spring indicated at 67 to engage contact a, thereby establishing a first circuit condition, and, on depression of the switch operating button 43 (as shown in FIG. 4), is moved down against the bias of the spring to engage contact b, thereby establishing a second circuit condition. Each microswitch has terminals d, e, f for the contacts a, b and contactor c, respectively, extending down from the case into the passage 57 under the ring 45.

The recess 61 (FIG. 7), which is narrower and deeper than each recess 59, is also open at top and bottom, being positioned (as a result of registration of ring 45 in its assembly with end wall 19) in registry with a recess 69 in the rim 19a of the end wall 19. Recess 69 is bounded by a peripheral portion 71 of the rim, in which there is secured a triple-terminal socket 73, the terminals of which are indicated at P1, P2 and P3 in FIG. 9. Wiring lodged in passage 57 comprises a line 75 connecting P1 and terminal f of switch S1, a line 77 connecting terminal e of switch S1 and f of S2, a line 79 connecting e of S2 to f of S3, a line 81 connecting e of S3 to P2, and a line 83 connecting terminals d of all these switches and P3. The socket 73 is adapted for plugging in a plug at one end of a three-wire electrical cable 84 (FIG. 1), the cable being adapted for connection at its other end to the robotic apparatus via a connection 84a on the torch in known manner for establishing control of the robotic apparatus by safety mount 1 as will be subsequently described.

The operating buttons 43 of the three switches S1, S2, S3 are normally (i.e., in the absence of any encounter by the torch 7 of an impediment) held pressed down with resultant establishment of the aforesaid second circuit condition (shown in solid lines in FIG. 9) by a member 85, which may be termed a presser head or switch plate, biased in the direction toward the second end 13 of the housing, said presser head or switch plate being situated in the housing on top of the switches for engagement with their buttons and having a stem or shaft 87 extending on the axis A of the housing out of the second end 13 of the housing through central opening 31 in the end wall 19. The presser head 85 comprises a metal disk of such diameter as to have a loose fit in the housing 1. The head 85 and stem 87 are integrally formed; the head/stem formation may be thought of as a mushroom formation. The bias on the presser head 85 is provided by a coil compression spring 89 (FIG. 4) surrounding guide 29 and reacting from end wall 17 downward on a pusher or presser plate 91 bearing down on presser head 85, plate 91 being in the form of a disk on the lower (inner) end of a rod 93 axially movable in the bushing 30 in guide 29. The disk 91 is of smaller diameter than the presser head 85 and has an upturned rim 95 for confinement of the lower end of spring 89. The disk 91 and rod 93 may be thought of as resembling a piston and piston rod.

The stem 87 extends well out of the housing 9 through opening 31 in end wall 19 of the housing, this opening being of substantially larger diameter than the stem to allow for ample angular deflection of the stem with respect to the axis A. The means 5 for holding the welding torch 7 is shown to comprise a bracket 97 having a radial clamp 99 with an opening 101 for the stem 87 and a split 103 fastened on the outside end of the stem by bolt and nut fastening means indicated at 105, the bracket having an arm 107 extending parallel to axis A. Means 5 further comprises a link 109 extending from the arm and carrying a holder 111 for the welding torch. The link may be angularly adjustable with respect to the arm, and the holder may be angularly adjustable with respect to the link as shown in FIG. 2.

Figure 10:
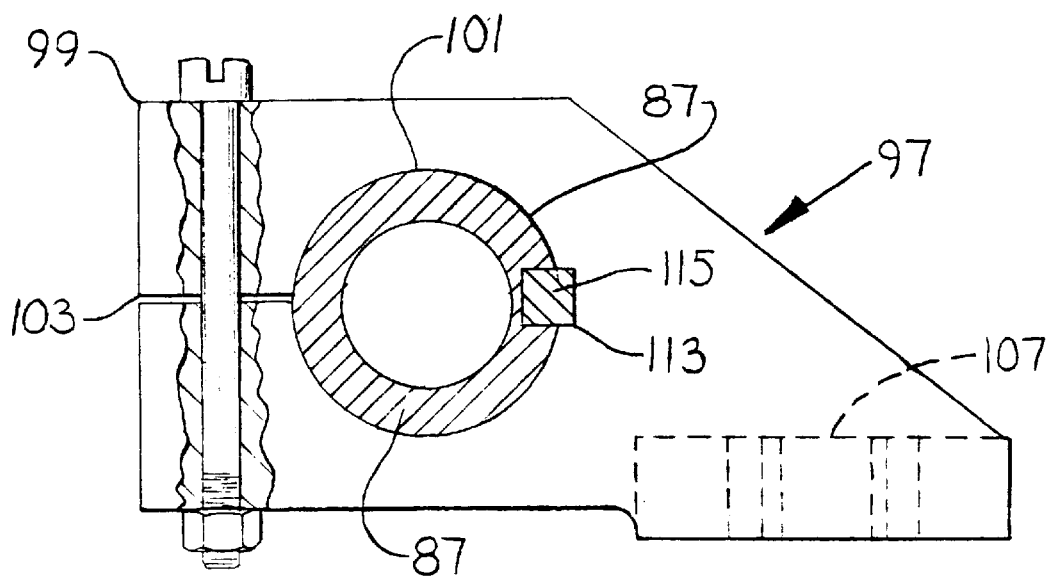
FIG. 10 is a view in section generally on line 10—10 of FIG. 1.
Figure 11:
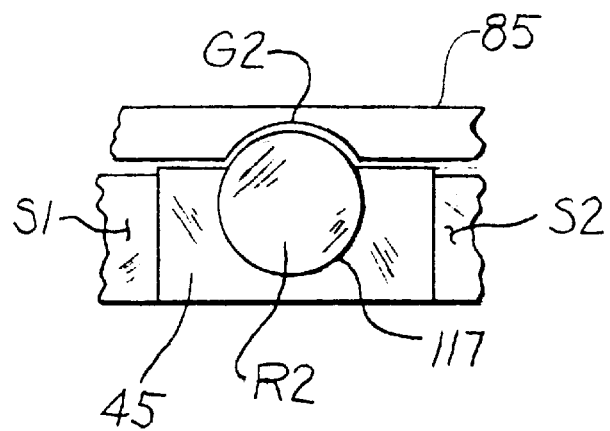
FIG. 11 is a view in elevation generally on line 11—11 of FIG. 7.

As shown in FIG. 10, the clamp 99 is keyed on the stem or shaft 87, having a keyway 113 receiving a key 115 on the stem, thereby holding the clamp in a predetermined angular orientation with respect to the presser head 85. The presser head is held in predetermined angular relationship with respect to the ring 45, i.e., held against rotation on the axis of the stem 87, but is allowed to cant (tilt) and/or move axially away from the ring 45 by a registration system comprising four registration pins R1–R4 on ring 45 acting as detents in four grooves G1–G4 in the lower face of the presser head 85 (the face thereof facing the ring). Each pin R1–R4 consists of a short cylindrical rod lodged in a part-cylindrical recess 117 extending inward toward axis A from the periphery of the ring 45, the four pins being arranged in a generally cruciform pattern between the switch recesses 59 (see FIG. 7). Each recess 117 is of part-circular cross-section somewhat greater than semi-circular, and each pin, being of circular cross-section, has an upper part protruding above the top surface of the ring. Each groove G1–G4 extends inward from the outer periphery of the presser head, being of part-circular cross-section matching the part-circular cross-section of the protruding part of the respective pin. As seen in FIG. 7, pins R1 and R3 are in line one with the other, and pin R2 is at right angles to R1 and R3. Pin R4 is at an angle slightly (e.g., 5°) off line with R2 for the purpose of allowing assembly of the presser head only one way, that being in the proper orientation as far as the key 115 on the stem 87 and hence the clamp 99 are concerned so that the torch is properly oriented with respect to the robot arm.

Figure 5:
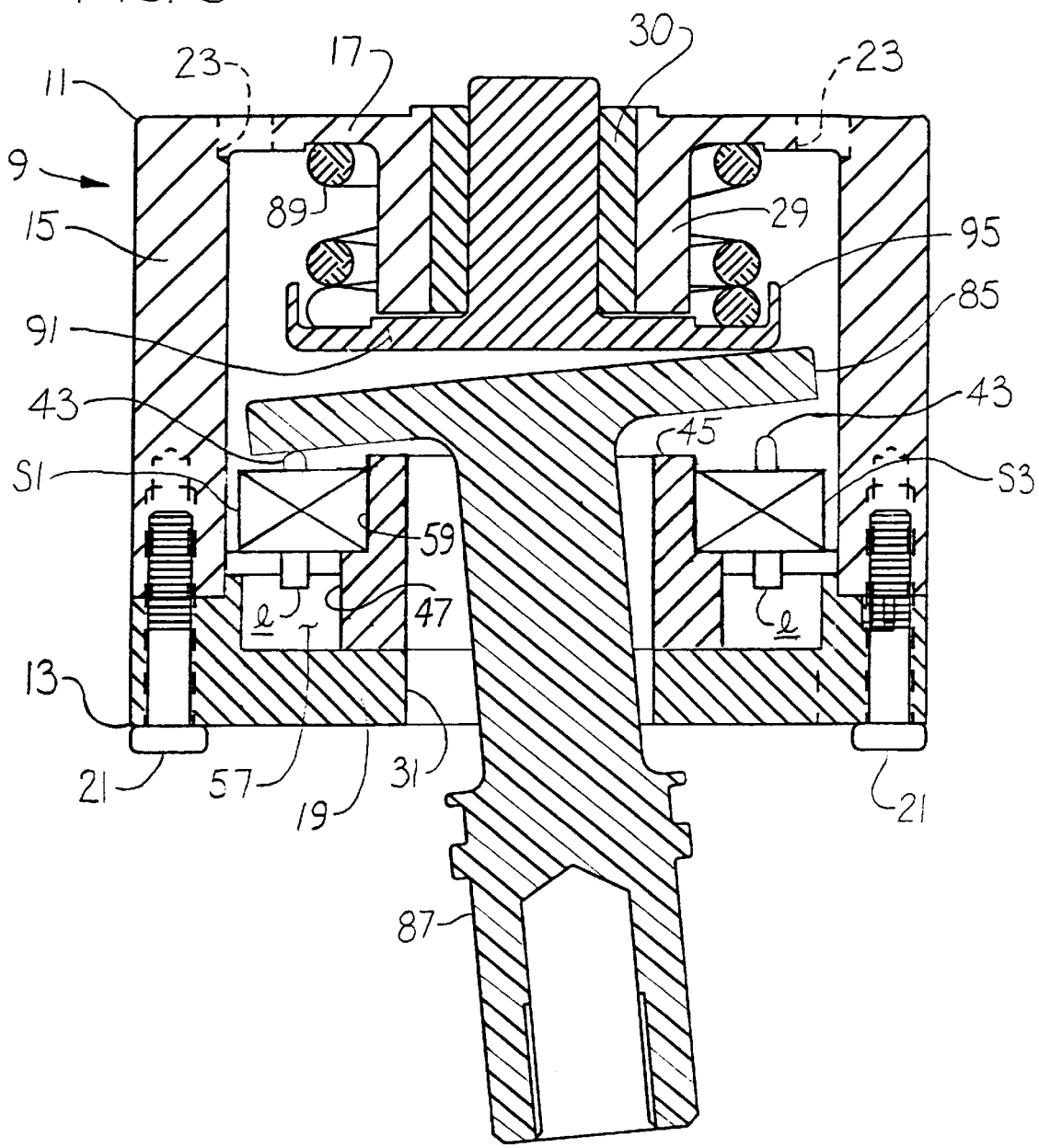
FIGS. 5 and 6 are longitudinal sections like FIG. 4 showing moved positions of parts resulting from an angular deflection event (FIG. 5) and from an axial deflection event (FIG. 6)

With the cable 84 suitably interconnecting the safety mount 1 and the robotic apparatus, and with the presser head 85 holding down the buttons 43 of all three switches S1, S2 and S3 (FIG. 4) so that the movable contactors c of all three switches are closed down on switch contacts b (the second circuit condition), electric current flows via P1, line 75, S1c, line 77, S2c, line 79, S3c and line 81 to P2, maintaining the robotic apparatus in operation. This status is maintained as long as the stem 87 is not deflected angularly off axis A or moved axially inward. However, if the torch in the course of its movement by the robot arm should encounter an obstruction causing angular deflection of the stem 87 and canting of the presser head 85 as illustrated in FIG. 5, the canting of the presser head results in the release of the operating button 43 of at least one of the switches with resultant opening of the movable contactor c of that switch off its contact b and closure of its movable contactor on its contact a, thereby breaking the P1–P2 circuit and establishing a P1–P3 circuit via line 83. This first circuit condition is illustrated by indicating in phantom in FIG. 9 the movable contactor S1c in released position. If the torch should encounter an obstruction resulting in axially inward deflection of the stem 87 and concomitant axial movement of the presser head 85, the operating buttons 43 of all three switches S1, S2, S3 are released, as illustrated in FIG. 6 for S1 and S3, with resultant opening of the movable contactors c of all three switches off switch contacts b and closure thereof on switch contacts a thereby breaking the P1–P2 circuit and establishing the P1–P3 circuit (here again the first circuit condition). Establishment of the stated first circuit condition acts as a safety signal shutting down the robotic apparatus and, for example, providing an audible or visual alarm that attention is needed.

Figure 2:
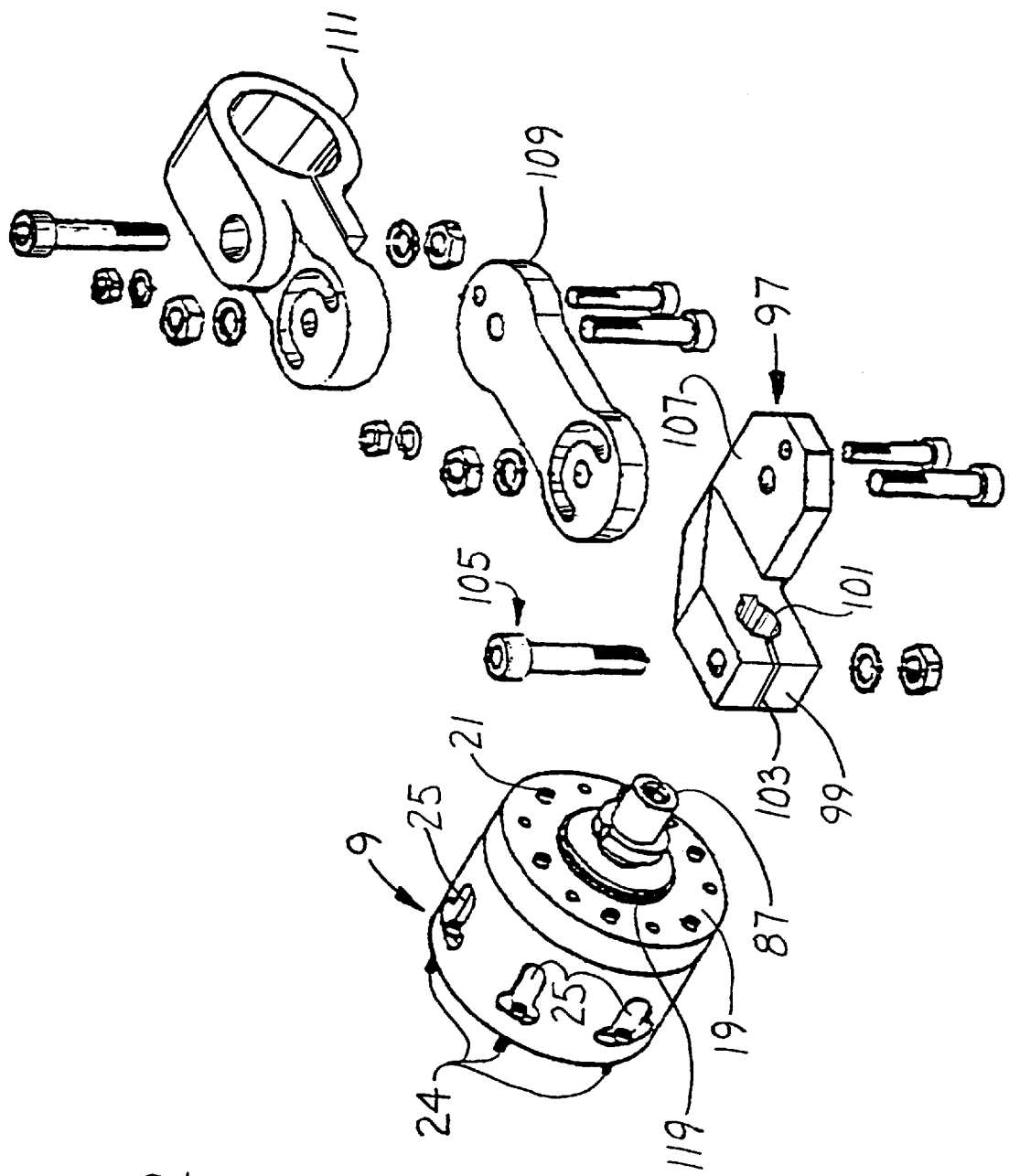
FIG. 2 is an exploded view in perspective showing the safety mount and parts of the torch holding means associated with the safety mount.

At 119 in FIGS. 1–3 is indicated an elastomeric (e.g., rubber) closure for the opening 31 in end wall 19 of housing 3, being flexible to allow the aforementioned angular and axial deflection of the stem. The closure has a central opening 121 in which the stem has a tight fit. The closure is not shown in FIGS. 4–6 for simplification. In an alternative mode, the closure has an upstanding annular rim which is stretched around the end wall 19 and which has a notch therein for socket 73. The opening 31 is sufficiently large to permit angular deflection of the stem beyond that which normally shuts down the robotic apparatus if for some reason shut-down should be somewhat delayed.

In a physical embodiment of the safety mount constructed in accordance with this invention, shut-down of the robotic apparatus has been attained for an angular deflection of the stem as low as 110°0 off axis A in any direction, and for axial deflection of the stem 87 (and presser head 85) as low as 0.050 inch. Also, if substantial torsional forces are exerted on the stem, the presser head 85, which is integral with the stem, will rotate relative to the ring 45, causing the pins R1–R4 to move out of their respective grooves G1–G4. If this movement exceeds a predetermined amount (e.g., a torsional deflection of 5 degrees), the axial separation between the presser head and the ring becomes sufficient to release the operating buttons 43 of one or more switches S1, S2, S3 to shut down the robotic apparatus.

It will be observed that the arrangement with the three switches S1, S2, S3 may be considered to involve a plurality of pairs of electrical terminals in housing 9, namely pairs S1f and S1e, S2f and S2e and S3f and S3e, each pair being situated radially outward of axis A, the member 85, 87 having head 85 being biased (by spring 89) in the direction toward the second end 13 of the housing for effecting electrical connection of the terminals of each pair. And it will be further observed that the terminal pairs are connected in an electrical circuit in series for completion of the circuit when the terminals of each pair are connected, the circuit being broken when the torch encounters an obstruction with resultant angular deflection of the head 85 breaking at least one of the connections or moving the stem 87 axially inward with resultant movement of the head to break all the connections.

It will be understood that switch circuits other than the circuit shown in FIG. 9 can also be used without departing from the scope of the invention, so long as axial and/or angular (tilting) movement of the presser head causes shutdown of the robotic apparatus.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A safety mount for a tool or other working instrumentality on robotic apparatus, for protection thereof should the tool or instrumentality encounter an obstruction to movement by the apparatus, said mount comprising a hollow housing having a first end and a second end and an axis extending longitudinally thereof passing through said ends, said housing being attachable at said first end to the robotic apparatus for robotic movement thereof, a plurality of electrical switches mounted in the housing radially outward of said axis, each having an operating member facing toward said first end of the housing and biased toward said first end to a position establishing a first circuit condition and movable to a pressed-down position establishing a second circuit condition, a presser head for the switches in the housing biased in the direction toward said second end for pressing down the switch-operating members, said presser head having a stem extending generally on said axis out of the second end of the housing for attachment thereto of a holder for said tool or instrumentality, said tool or instrumentality acting on encountering an obstruction either to deflect said stem at an angle to said axis with resultant angular deflection of said presser head releasing at least one switch-operating member or to move the stem inwardly with respect to the housing with resultant axial movement of the presser head away from said switch-operating members releasing all of them, thereby establishing said first circuit condition as a safety signal.

2. A safety mount as set forth in claim 1 wherein the operating member of each switch has a push button held in pushed-down position by said presser head establishing said second circuit condition, the button of at least one switch being released on said angular deflection of the presser head and the buttons of all the switches being released on said axial movement of the presser head away from the buttons.

3. A safety mount as set forth in claim 2 having a ring in the housing adjacent said second end of the housing, said ring having recesses therein spaced at intervals around said axis, each said recess having an open top toward said first end of the housing, and each switch comprising a switch case mounted in a respective recess with the push button thereof at the open top of the recess.

4. A safety mount as set forth in claim 3 wherein each said recess has an open bottom toward said second end of the housing, and each switch case has switch terminals extending down therefrom at the said open bottom of the respective recess.

5. A safety mount as set forth in claim 4 having wiring connecting the switch terminals below the ring.

6. A safety mount as set forth in claim 3 wherein the housing comprises an annular wall having an end wall at said second end with a central opening in the end wall for said stem, said ring being mounted in the housing adjacent said second end wall with an annular space therebetween.

7. A safety mount as set forth in claim 6 having wiring for said switches in said annular space, said second end wall having means terminating said wiring extending outward therefrom for connection of a cable for interconnection with the robotic apparatus.

8. A safety mount as set forth in claim 1 wherein the housing comprises an annular wall having an end wall at said first end, said end wall having a series of holes for receiving screws spaced at intervals around a circle inward of and adjacent said annular wall for attachment to the robotic apparatus, said annular wall having a series of slots extending longitudinally thereof for access to the holes.

9. A safety mount as set forth in claim 1 wherein the housing comprises an annular wall having an end wall at said first end, said end wall having a tubular guide extending inward therefrom on said axis, the bias on said presser head being applied by a coil compression spring surrounding said guide and reacting from said end wall on a pusher on the inner end of a rod slidable in said guide, the pusher engaging the presser head.

10. A safety mount for a tool or other working instrumentality on robotic apparatus, for protection thereof should the tool encounter an obstruction to movement by the apparatus, said mount comprising a hollow housing comprising an annular wall having a first end wall at one end and a second end wall at the other, said housing having an axis extending generally longitudinally centrally thereof, said housing being attachable at the first end wall to the robotic apparatus for robotic movement thereof, said first end wall having a tubular guide extending inward therefrom on said axis, said second end wall having a central opening, a ring mounted axially in said housing inside said second end wall, the opening of the ring being coaxial with the opening in the second end wall, a plurality of electrical switches secured to the ring at spaced intervals around the ring outward of the opening of the ring, each switch having an operating member on the side of the ring toward the first end wall biased in the direction toward the first end wall to a position establishing a first circuit condition and movable in the other direction against the bias to a second position establishing a second circuit condition, a presser head for the switches in the housing on said side of the ring engageable with the switch operating members for pressing them down to their said second position, said presser head having a stem extending generally on said axis through the openings in the ring and second end wall out of the housing for attachment thereto of a holder for said tool or other instrumentality, a rod slidable in said tubular guide, a pusher on the inner end of the rod engaging the presser head, and a coil compression spring surrounding the guide reacting from said first end wall on said pusher.

11. A safety mount as set forth in claim 10 wherein the operating member of each switch is an upwardly biased push button held in pushed-down position against said bias thereon by said presser head establishing said second circuit condition, the button of at least one switch being released on said angular deflection of the presser head and the buttons of all the switches being released on said axial movement of the presser head away from the buttons.

12. A safety mount as set forth in claim 11 wherein the ring has recesses therein spaced at intervals around said axis, each said recess having an open top toward said first end wall, each switch comprising a switch case mounted in a respective recess with the push button thereof at the open top of the recess.

13. A safety mount as set forth in claim 12 wherein each said recess has an open bottom toward said second end wall of the housing, and each switch case has switch terminals extending down therefrom at the said open bottom of the respective recess.

14. A safety mount as set forth in claim 13 having wiring in said housing below the ring interconnecting the switch terminals.

15. A safety mount as set forth in claim 10 wherein said first end wall has a series of holes for receiving screws spaced at intervals around a circle inward of and adjacent said annular wall for attachment to the robotic apparatus, said annular wall having a series of slots extending longitudinally thereof for access to the holes.

16. A safety mount as set forth in claim 14 wherein said ring is mounted in the housing adjacent said second end wall with an annular space therebetween, said wiring for said switches being disposed in said annular space, said second end wall having a socket terminating said wiring extending outward therefrom for connection of a cable for interconnection with the robotic apparatus.

17. A safety mount as set forth in claim 10 having a registration system for maintaining the presser head in predetermined orientation with respect to the ring.

18. A safety mount as set forth in claim 17 wherein said registration system comprises at least one detent and cooperating groove on the ring and presser head holding the presser head against rotation on said axis while allowing canting and axial movement of the presser head.

19. A safety mount as set forth in claim 18 having detents constituted by pins protruding from the ring and extending generally radially thereof between the switches, the presser head having a plurality of grooves in the face thereof facing the ring and receiving the pins.

20. A safety mount for a tool or other working instrumentality on robotic apparatus, for protection thereof should the tool or instrumentality encounter an obstruction to movement by the apparatus, said mount comprising a hollow housing having a first end and a second end and an axis extending longitudinally thereof passing through said ends, said housing being attachable at said first end to the robotic apparatus for robotic movement thereof, a plurality of pairs of electrical terminals in the housing, each pair being situated radially outward of said axis, a member having a head in the housing and a stem extending generally on said axis out of the second end of the housing for attachment thereto of a holder for said tool or instrumentality, said member being biased in the direction toward said second end for effecting electrical connection of the terminals of each pair, said pairs being connected in an electrical circuit in series for completion of the circuit when said terminals of each pair are connected, said circuit being broken when said tool or instrumentality encounters an obstruction with resultant angular deflection of said presser head breaking at least one of said connections or the encounter moves the stem axially inward with resultant movement of said head to break all the connections.

* * * * *